United States Patent [19]

Orain

[11] 3,881,792
[45] May 6, 1975

[54] COMPACT AXIAL RETAINER SAFETY DEVICE FOR ROTATABLE MEMBERS

[75] Inventor: Michel Orain, Conflans-Sainte-Honorine, France

[73] Assignee: Societe Anonyme dite: Glaenzer Spicer, Poissy, France

[22] Filed: Apr. 8, 1974

[21] Appl. No.: 458,890

[30] Foreign Application Priority Data
Apr. 27, 1973 France............................. 73.15501

[52] U.S. Cl........ 308/237 R; 277/206; 308/DIG. 11
[51] Int. Cl............................................. F16c 19/24
[58] Field of Search......... 308/208, DIG. 11, 237 R; 277/160, 205, 206, 236

[56] References Cited
UNITED STATES PATENTS
2,769,675 11/1956 Hamm ................................ 277/160
3,758,123 9/1973 Ksieski.............................. 277/206

Primary Examiner—M. Henson Wood, Jr.
Assistant Examiner—Michael Mar
Attorney, Agent, or Firm—Baldwin, Wight & Brown

[57] ABSTRACT

A compact resilient retainer ring for axially retaining a roller slidably and rotatably mounted on a spindle by needle rollers, and the needle rollers. The ring is U-shaped in radial cross-section and has a radially inner wall and a radially outer wall with a bowed connecting portion. The inner wall is adapted to resiliently bear against a groove machined in the outer surface of the spindle. The outer wall is adapted to retain the roller and the connecting portion is adapted to retain the needle rollers. The inner wall is provided with corrugations, the radially innermost portions of the corrugations are tangent to a circle having a diameter less than that of the spindle. The outer wall may also be provided with such corrugations, or with a flared frusto-conical outer portion, or it may be simply a plain cylindrical wall.

6 Claims, 6 Drawing Figures

PATENTED MAY 6 1975  3,881,792

COMPACT AXIAL RETAINER SAFETY DEVICE FOR ROTATABLE MEMBERS

DETAILED DESCRIPTION OF THE INVENTION

The present invention relates to a compact axial retainer safety device (of small dimensions) for rotatable member(s) and of the type formed as a resilient retainer ring which snaps into place and springs outwards by radial spring force into a groove machined in the surface of a spindle on which rotatable member(s) are to be retained by the ring for rotation. Such a retainer ring is particularly applicable in situations in which the available radial clearance surrounding the spindle is not 30% greater than the diameter thereof.

All known retainer rings combine the advantages of low production cost and quick mounting. On the other hand, they do not provide absolute safety for the following reasons.

Firstly, the shapes of such known retainer rings are complicated and necessarily include a certain number of notches which are so often the cause of tears and ruptures during their manufacture and right up to their assembly by resilient deformation to say nothing of the thermal shocks to which they are subjected during the treatment which follows their being punched out and the forces and stress to which they are subjected while they are in service.

Blanking or punching out dies of complicated configuration are easily worn out which results in a progressive alteration of the dimensions of the rings as well as the quality of the edge surfaces of the members.

Further, in order to achieve a resiliency sufficient for the expansible anchoring tongues of such known retainer rings, especially when the available surrounding space is limited, one is led to make the tongues rather long to give them the desired resiliency which necessitates the undercutting or screw-cutting of the ring retaining groove to a diameter which is substantially less than that of the spindle and in the immediate vicinity of the end thereof.

This special screw-cutting must be carried out with strict tolerances, namely with respect to the retaining diameter, to ensure the reliability of the assembly; since the resilient expansion for assembly is limited, too large a diameter could cause a rupture of the retainer ring during assembly, whereas too small a diameter might allow the retainer ring to escape during eccentric axial stressing.

An aim of the invention is a retainer ring which overcomes these shortcomings and which is much more reliable and has a lower production cost than known retainer rings.

The retainer ring according to the invention may, in a known way, be made of a hard resilient metal such as tempered or carbonitrided steel or even a copper alloy of copper and beryllium or the like.

The retainer ring according to the invention is preferably U-shaped in cross-section with corrugations in the inner skirt or wall thereof through a mean circle located in a plane parallel to the general plane of the retainer ring; the portions of the corrugations which are closest to the center of the retainer ring are tangent to a circle having a diameter less than that of the shaft or spindle on which the retainer ring is to be mounted.

The outer skirt or wall of the retainer ring may be a plain cylindrical wall or may have at its free edge a frusto-conical flared flange, or it may be corrugated like the inner skirt for reasons which will be specified hereinafter.

Several embodiments of the retainer ring according to the invention are described herein with reference to the accompanying drawings, in which:

FIG. 1 is a cross-sectional view, taken on the diameter I—I in FIG. 2, of a first embodiment of a retainer ring provided for retaining, on a spindle carrying a roller, needle rollers for the roller and the roller itself, the left-hand side of the figure showing the retainer ring in position on the spindle and the right-hand side of the figure showing the positioning of the retainer ring on the spindle.

In the illustrated embodiments, the retainer ring 1 is provided to axially retain on a spindle 2, for example, of a cross-piece or a tripod (three-arm member) of a universal joint, needle rollers 3 for frictionless rotation of a roller 4 carried on the spindle. The retainer ring 1 also retains the roller itself with a certain degree of axial clearance, which may be partial or total, as will be explained hereinafter.

Figure 1:
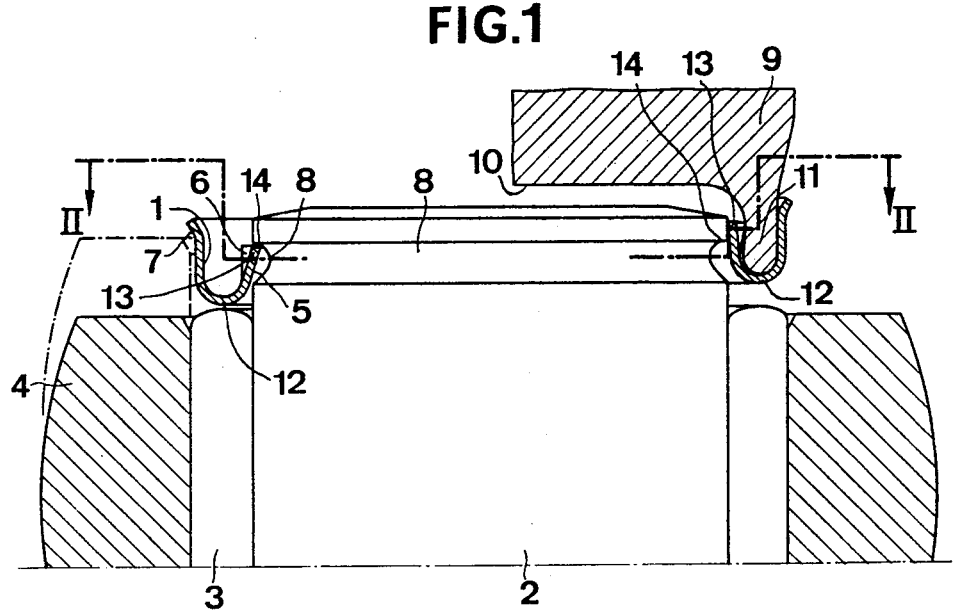
Figure 2:
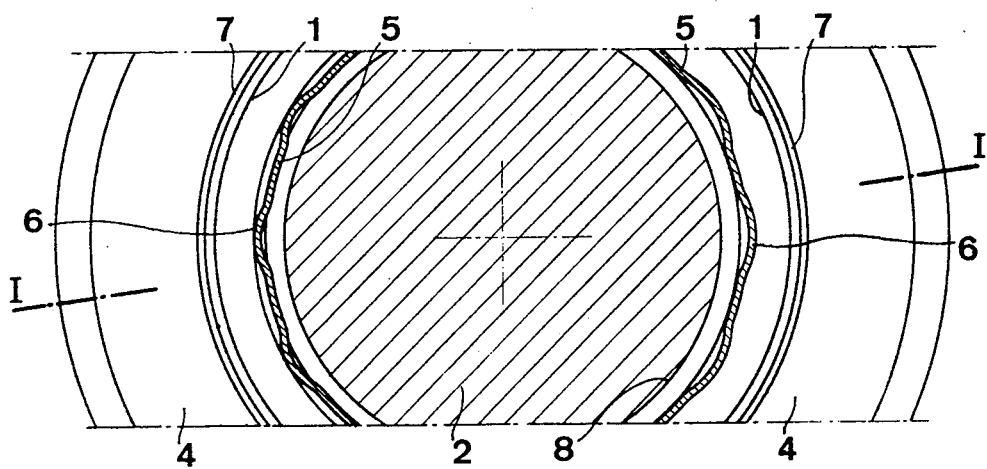
FIG. 2 shows a partial cross-sectional view taken on the line II—II in FIG. 1.

In the embodiment illustrated in FIGS. 1 and 2, the retainer ring 1 which is preferably formed of a hard resilient metal, such as tempered or carbonitrided steel, or a copper alloy, such as a copper-beryllium alloy, is U-shaped in radial cross-section. The inner skirt or wall of the retainer ring has part-circular corrugations 5 (FIG. 2), the centers of which coincide with the axis of the retainer ring, and which are bent toward the axis of thereof. The part-circular corrugations 5 are separated from one another by other part-circular segments or portions 6 having a much smaller radius. The free outer edge of the retainer ring 1 is flared outwardly for forming a frusto-conical flange 7. The inner diameter of the retainer ring 1 is such that the innermost portions of the segments 6 are tangent to a circle concentric with the retainer ring, the diameter of the circle being substantially equal to that of the spindle 2. The largest diameter of the outer skirt excluding the flared portion is less than the inner diameter of the roller 4, and the outer diameter for the free edge of the conical flange 7 is greater than the inner diameter of the roller 4.

An annular retaining groove 8 is machined in the spindle 2 near the end thereof. The mounting of the retainer ring is carried out in the following manner.

The retainer ring 1 is brought in contact against the end of the spindle 2, and is driven on the spindle by means of a tool 9 which has an annular projecting portion 11 located at the periphery of its front face 10 and adapted to come into engagement against the bottom of the bowed connecting portion 12 of the retainer ring. The inner wall or skirt of the retainer ring is forced outwardly, as shown at the right-hand side in FIG. 1, which is possible owing to the circumferential extensibility provided by the part-circular portions 6, until the inner edge 13 of the corrugations 5 reaches the axial position corresponding to the top portion 14 of the groove 8. The inner wall or skirt then springs inwardly (left-hand side of FIG. 1), and the inner edge 13 snaps into the groove 8 bearing along the underside of the top portion 14 thereof.

It should be noted that at the time of the inner wall snapping into the groove, the edge surface of the retainer ring is not subjected to circumferential tensile stress, but to a general compressive stress which constitutes an additional safety factor against the possibility of creep during the mounting of the retainer ring, and thus is a considerable advantage over known retainer rings.

The dimensions of the retainer ring, in particular the depth of the U formed in cross-section, are determined so that the convex surface or extrados of the bowed portion axially retains the needle bearings 3 in the desired position. The roller 4 retains a certain degree of axial sliding freedom which is limited by the abutment of the roller against the conical flange 7 of the retainer ring.

When the retainer ring 1 is in position a certain degree of radial play or clearance may be present between the bottom of the groove 8, which moreover may be machined without great radial precision, and the inner skirt of the retainer ring, thus enabling the free rotation of the retainer ring. As for the corrugations 5 and 6, they may have greater or less depths as long as the desired circumferential resiliency is obtained.

Figure 3:
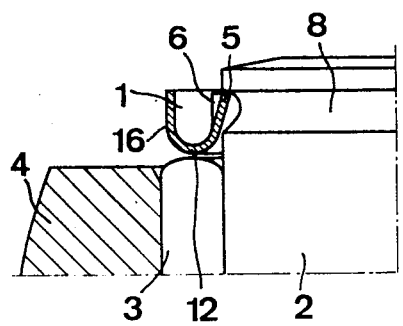
FIG. 3 is a partial cross-sectional view taken along the diameter of an alternative embodiment of the retainer ring.

In an alternative embodiment of the retainer ring, illustrated in FIG. 3, the same reference numerals designate the same elements as in FIGS. 1 and 2, the only difference being that the outer skirt or wall 16 of the retainer ring 1 does not have a frusto-conical outer flange, thereby leaving the roller 4 completely free for axial displacement along the spindle.

Figure 4:
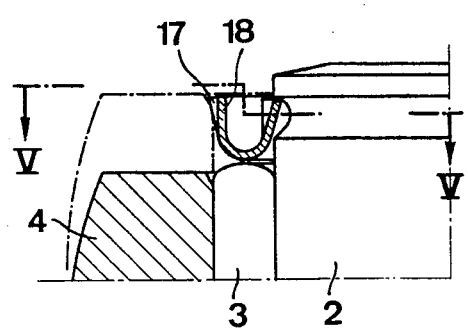
FIG. 4 is a partial cross-sectional view on a diameter of another embodiment of the retainer ring provided for the same purpose as that of FIG. 1.
Figure 5:
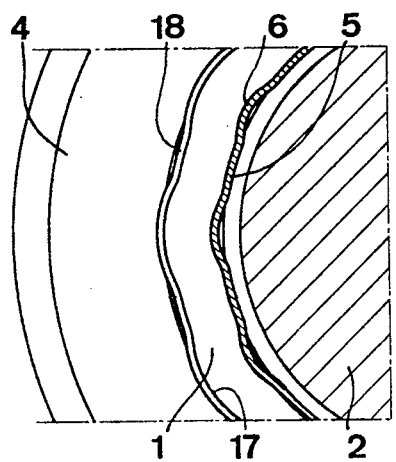
FIG. 5 is a cross-sectional view taken on the line V—V of FIG. 4.
Figure 6:
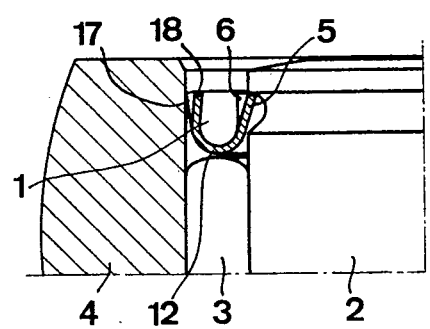
FIG. 6 is a view similar to that of FIG. 4 in a particular position of the roller with respect to the retainer ring.

FIGS. 4 and 6 show a second alternative embodiment of the retainer ring in which the same basic elements are found as in the preceding embodiments and are designated by the same reference numerals. This embodiment differs from the previous embodiments by the fact that the outer skirt of the retainer ring has corrugations 17 and 18 similar to the corrugations 5 and 6 along the inner skirt which gives the roller 4 complete freedom of movement over a short axial distance, for example about 1 mm, as in the previous embodiment, owing to which the roller comes into abutment against the flared flange, in this case, formed by the corrugations. The roller is, however, able to effect longer axial displacements by engaging the corrugated edge of the retainer ring in response to a greater force. The value of this greater force is determined by the amount or depth the edges of the corrugations 18 project and is that which is necessary for radially and resiliently flattening the outer skirt of the retainer ring as shown in FIG. 6.

This last feature is absolutely necessary when, under certain circumstances, the roller is required to have substantial sliding displacement but the available space does not allow the retaining flange 7 in FIG. 1 to be greatly lengthened. Indeed, without such an arrangement, for all types of known axial retaining means, excessive slipping of the roller might damage the retainer ring.

The retainer ring according to the present invention has the same advantages as known retainer rings, viz. low production cost and quick mounting, as well as the following additional advantages seen in the above-described embodiments.

First of all, increased reliability; indeed, a. the retainer ring is substantially a body of revolution; therefore, it may be punched out with a punching die of corresponding configuration, which is long lasting and strong, inexpensive to manufacture and service, and wear resistant, thereby allowing parts to be massed produced free of cutting flaws. This retainer ring has no notches or delicate projections or tongues which lead to deformations or breaking in heat treatment or stamping.

b. the retaining diameter used by this retainer ring is the diameter of the spindle on which it is mounted. The necessary groove in the spindle is machined directly from the outside surface thereof. Since the diameter is generally machined with accuracy for reasons other than mounting the retainer ring, there is no possibility of variations in the retaining diameter and therefore no possibility of the escape of the retainer ring in case of too small a retaining diameter or damage to the retainer ring due to too large a retaining diameter.

c. The bearing of the retainer ring is effected in a zone very close to the point at which it is urged by the needle rollers which is localized along an arc of 30° – 60°. The rocking couple applied to this retainer ring is therefore negligeable and the forces are transmitted directly from the bearing surface to the flanks of the grooves to the ends of the needle rollers to the retained.

Moreover, the retainer ring according to the invention causes related costs to be reduced in comparison to those of known retainer rings for the following reasons:

1. Since the retaining groove is cut directly into the outer surface of the spindle, it is more easily machined and does not require strict working tolerances. In fact, it is only the retaining diameter (equal to the diameter of the spindle) which has to be accurate, and this is already called for other reasons and therefore is obtained without cost attributable to retainer ring;

2. The punching dies for punching out the retainer ring is one of the most simple, since, as noted above, it consists entirely of bodies of revolution. The production cost and the service cost of such punching dies is therefore less than punching dies for punching out known resilient retainer rings.

What is claimed is:

1. A resilient retainer ring for axially retaining at least one member for rotation on a spindle member having a groove in its outer surface, said retainer ring being generally U-shaped in cross-section and having a radially inner wall adapted to be clicked into and resiliently bear against the groove in the spindle member and a radially outer wall, the radially inner wall having corrugations, formed therealong, the mean circle of the corrugations being parallel to the general plane of the retainer ring, the radially innermost portions of the corrugations being tangent to a circle having a diameter less than that of the spindle member.

2. A retainer ring according to claim 1, wherein the radially outer wall is adapted to axially retain said one member which is an annular roller adapted to rotate on and slide along the spindle member.

3. A retainer ring according to claim 2, wherein the radially inner wall is connected to the radially outer wall by a bowed connecting portion which is adapted to axially retain needle rollers for the annular roller.

4. A retainer ring according to claim 2, wherein the radially outer wall of the ring is a smooth cylindrical wall.

5. A retainer ring according to claim 2, wherein the radially outer wall has a flared frusto-conical flange on its free end.

6. A retainer ring according to claim 1, wherein the radially outer wall of the retainer ring has, on its free end, corrugations similar to those along the radially inner wall.

* * * * *